Sept. 5, 1967    F. D. CROSSWELL    3,339,619
DOOR SEAL

Filed June 22, 1964    2 Sheets-Sheet 1

Inventor:
Flay D. Crosswell
By Bair, Freeman & Molinare Attys.

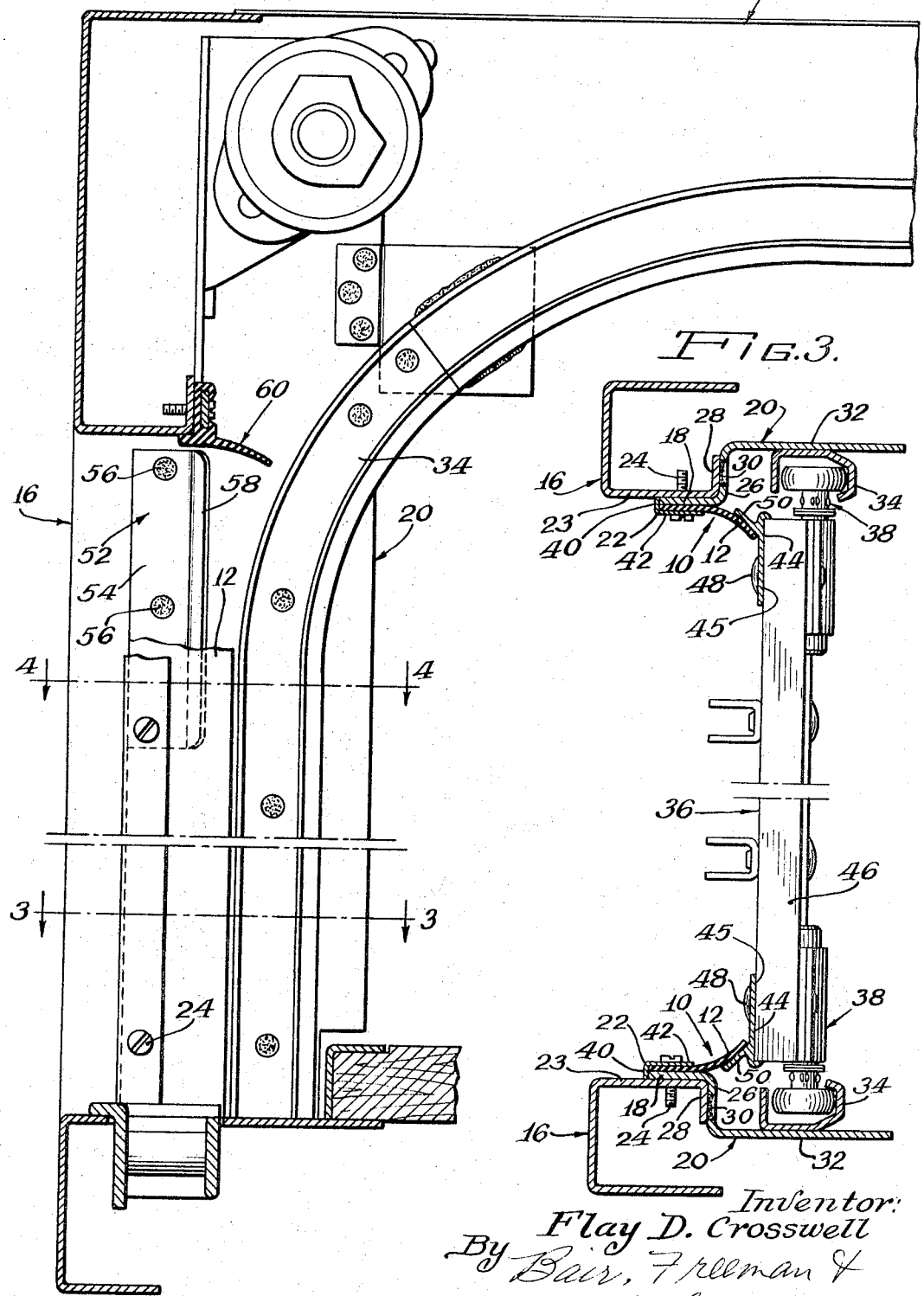

United States Patent Office 3,339,619
Patented Sept. 5, 1967

3,339,619
DOOR SEAL
Flay D. Crosswell, Marion, Ohio, assignor to Overhead Door Corporation, Hartford City, Ind., a corporation of Indiana
Filed June 22, 1964, Ser. No. 376,698
5 Claims. (Cl. 160—40)

This invention relates to improved sealing means for upward acting sectional door assemblies having a plurality of panel sections and it particularly relates to improved seals for such door assemblies when used on trucks.

Although it is always desirable to provide an effective seal between a door and the opening which it encloses, the sealing problem is particularly acute in the case of upward acting sectional doors on truck openings. The reason for the increased sealing problem is that a particularly good seal is required for trucks since they are often used for the transportation of perishable goods which are adversely affected by atmospheric conditions, such as rain, extreme heat or extreme cold.

Although various sealing means have been provided for effecting a seal between an upward acting sectional door assembly and a truck door opening, known sealing apparatus has a significant drawback in that the sealing apparatus requires an excessive amount of space whereby the door opening is more restricted than desired and is much less wide than the interior of the truck. In the known seals, the lateral edges of the door assembly generally overlap the door jambs, thereby losing effective opening space. This loss of opening space results in an undesired loss of effective storage space in the truck interior. This loss of space is particularly significant when the truck has racks in the interior for storing trays containing the goods being transported, such as might be found in a bakery truck.

It is therefore an important object of this invention to provide improved apparatus for effecting a seal between an upward acting sectional door assembly and the sides of a door opening wherein the disadvantages of prior art sealing apparatus are substantially avoided.

It is also an object of this invention to provide improved sealing apparatus for an upward acting sectional door assembly wherein the sides of the door opening are at a maximum spacing to thereby increase the useful storage space within the truck.

It is a further object of this invention to provide apparatus for effecting a seal between the lateral edges of a door assembly and door jambs wherein there is substantially no overlapping between the edges of the door and the inner edges of the door jambs.

It is another object of this invention to provide improved apparatus for effecting a particularly effective seal between the lateral edges of an upward acting sectional door assembly and the door jambs of an opening for an enclosed truck.

It is yet another object of this invention to provide improved upward acting sectional door sealing apparatus wherein the sealing apparatus is characterized by its simplicity and economy of construction and manufacture.

Further purposes and objects of this invention will appear as the specification proceeds.

A particular embodiment of the present invention is illustrated in the accompanying drawings wherein:

FIGURE 2 is a partially sectioned, side elevational view of my sealing means for an upward acting sectional door assembly, the door itself not being shown since it is in the fully raised position;

FIGURE 3 is a sectional view taken along the line 3—3 of FIGURE 2;

Figure 1:
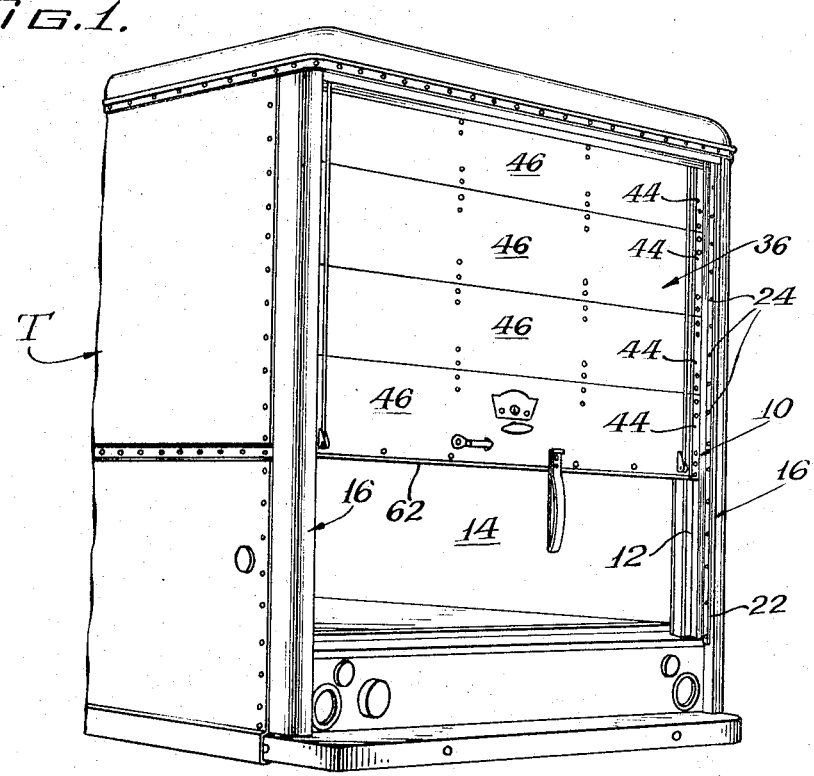
FIGURE 1 is a fragmentary, perspective view of my improved door seal in place on a truck.

With reference to the drawings, my improved sealing apparatus, generally 10, is shown in position on a truck T, seen best in FIGURE 1. My improved sealing apparatus 10 includes elongated resilient sealing strips 12 which are vertically mounted along the opposite sides of the truck door opening 14. Each of the strips 12 is mounted on an upright corner post or door jamb 16, which together form the opposite sides of the truck opening 14.

Each sealing strip 12 is constructed of a resilient, water resistant material of the type commonly used for sealing purposes; suitable materials include rubber and various flexible plastic materials. The elongated, flattened strips 12 extend substantially along the entire height of the door opening 14. The cross section of each strip 12 is substantially rectanguluar, the length being substantially greater than the width to thereby provide for flexibility of the strip.

Referring to FIGURE 3, each of the sealing strips 12 is sealably positioned between the rearwardly extending flange 18 of a track support member 20 and a strip retaining member 22. The retainer 22, the sealing strip 12, and the track support member 20 are all securely and sealably mounted on the respective upright inner walls 23 of the door jambs 16 by means of vertically spaced screws or bolts 24 which are threaded into suitable apertures provided along the walls 23 of the jambs 16.

The rearwardly extending flange 18 of the track support member 20 is positioned at substantial right angles to the transverse base portion 26, which is welded to the adjacent outwardly extending flange 28 of the jamb 16, as at 30. The track supporting portion 32 of the support member 20 extends frontwardly from the base 26. The track members 34 are secured as by welding, to the track support members 20. The tracks 34 guide the upward and downward movement of the sectioned door 36 by cooperating with the roller assemblies 38, which are rotatably carried by the sections of the door 36. The retainers 22 are L-shaped in cross-section and include a base 40 which extends across the trailing edge of each sealing strip 12, while the forwardly extending portion 42 of the retainers 22 is positioned along the outer surface of the elongated sealing strips 12, thereby cooperating with the flange 18 of the support 20 for securing a strip 12 therebetween.

Each elongated upright sealing strip 12 cooperates with upright end stiles 44, which are positioned along the opposite edges or edge portions of each of the contiguous door sections 46, which form the upward acting sectional door assembly 36. Each of the stiles 44 is secured to the outer lateral edge portions 45 of each door section 46 by means of bolts 48. It is important that the stiles 44 be provided with rearwardly and outwardly angled projections 50 or projections 50 which are angled away from the door 36, which projections cause inward bending of each elongated sealing strip 12 or bending away from the door 36, whereby the strip 12 bears against the outer surfaces of each of the projections 50 for effecting a seal therebetween. The bearing force of the strip 12 against the outer surfaces of each angled projection 50 provides a positive seal with each of the upright stiles 44, to thereby substantially prevent the passage of moisture therebetween. When the door is completely closed, the end stiles 44 are upright and have their opposite end portions in close proximity with adjacent stiles 44, whereby passage of rain water is substantially avoided; the biased sealing strips 12 also substantially cover any gap which might occur between adjacent stiles 44.

Figure 4:
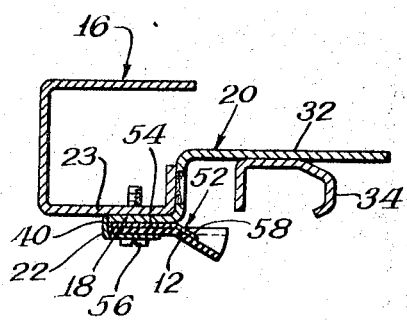
FIGURE 4 is a sectional view taken along the line 4—4 of FIGURE 2.

When the upward acting sectional door 36 is raised, the resilient sealing strips 12 are not biased and extend in a forward direction or toward the door opening 14. Since the stile projections 50 are normally positioned inwardly of the frontwardly extending strips 12, guiding means are provided at the upper portion of each door jamb 16. In order to properly guide the sealing strips 12 on to the outer surfaces of the projections 50, desirably, deflector plates 52 are securely mounted on the inner walls 23 of the door jambs 16, as seen most clearly in FIGURES 2 and 4. Each deflector plate 52 includes a base 54, which is secured by bolts 56 to the wall 23, as well as a forwardly and inwardly angled portion 58 or portion 58 which deflects the strip 12 away from the door 36 or its opening 14, which portion 50 deflects the upper end of each sealing strip 12 inwardly or away from the door a sufficient distance so that the lower ends of the stile projections 50 are on the lowermost door section 46 are properly guided on to the upper ends of the sealing strips 12 upon lowering of the door 36. Preferably, the deflector plates 52 extend from the top of the opening 14 to a point which is substantially equivalent to the height of an individual door section 46 so that the stile projections 50 are properly started on the sealing strips 12 in order to effect the desired seals along the lateral edges of the upward acting sectional door 36.

As seen most clearly in FIGURE 3, there is substantially no overlapping between the opposite edges of the door 36 and the inner edges of the door jamb 16, whereby the door 36 is less wide than the door opening 14. This is in contrast to previous constructions wherein there is substantial overlapping between the door 36 and the door jambs 16, causing a loss of effective storage space within the truck T. Thus, in my construction, there is a highly efficient use of storage space within the truck.

In order to provide a seal around the entire door 36 when it is in the closed position, an upper resilient sealing strip 60 is mounted on the cross support which forms the top of the door opening 14 and a resilient sealing strip 62 is provided at the lower end of the door 36. The upper and lower sealing strips 60 and 62 thereby cooperate with the improved lateral seal 10 for providing an effective seal around the entire door assembly 36.

Figure 5:
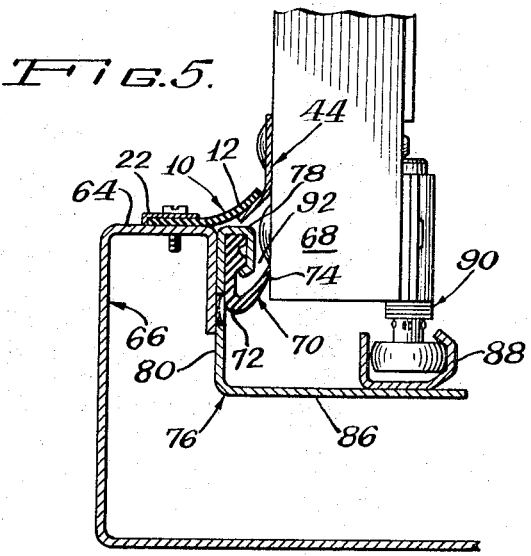
FIGURE 5 is a view, similar to FIGURE 3, but showing an alternate embodiment of my improved sealing means when used with an insulated door assembly.

Similar advantages of saving space within a truck are accomplished by the use of my sealing means 10 on an insulated truck. In this regard, attention is directed to the alternate embodiment of FIGURE 5. In this construction, my sealing strips 12 are sealably positioned between the inner walls 64 of the door jambs 66 and the retainer members 22. Stiles 44 are spaced inwardly of the lateral edges of an insulated door 68 and cooperate with the sealing strips 12, in the manner discussed above, for effecting a seal. This forms an exterior seal and an air space may be formed by providing interior seals 70; the air space is thus formed between my improved sealing apparatus 10 and the interior seal 70, which may be of known construction. The seal 70 includes a resilient sealing strip 72 having a tail portion 74 which resiliently bears against the outer lateral surface of the insulated door 68. The strip 72 is retained in place on a track support member 76 and specifically in a channel portion 78 formed in the base 80. A leg 86 extends from the base 80 and is adapted to securely receive a track member 88 thereon. The track rollably receives a plurality of roller assemblies 90 which are rotatably mounted along the inner surface of the door 68.

The seal provided by my sealing strip 12 and the seal 70 form an air space 92 therebetween to provide highly efficient insulation between the interior of the truck and the atmosphere. The space required for the formation of the air space 92 is considerably less when my sealing apparatus 10 is used for the exterior seal than when a seal 70 is used for the exterior seal as well as for the interior seal. Thus, not only in the sealing of a conventional upward acting sectional door but also in the sealing of the lateral edges of an insulated upward acting sectional door 68, there is a significantly more efficient use of storage space within a truck when my sealing apparatus 10 is used.

While in the foregoing there has been provided a detailed description of particular embodiments of the present invention, it is to be understood that all equivalents obvious to those having skill in the art are to be included within the scope of the invention as claimed.

What I claim and desire to secure by Letters Patent is:

1. Apparatus for sealing the space between the side of a door opening and a lateral edge portion of an upward acting sectional door assembly of the type having a plurality of panel sections, said apparatus comprising an elongated resilient sealing strip mounted along said side and projecting towards said door, deflector means for maintaining the upper portion of said strip deflected away from said door, projections angled away from said door and positioned along the lateral edge portions of each of said panel sections, said strip being deflected away from said door by and bearing against said projections when the door is closed whereby a seal is provided therebetween and as said door is moved downwardly from the open position to the closed position, the lower edge portion of the projections on the lowermost panel section being guided into sealing engagement with the upper portion of said strip which is being held in the said deflected position by said deflector means.

2. Apparatus for sealing the space between the sides of a door opening and the lateral edge portions of an upward acting sectional door assembly having panel sections, said apparatus comprising resilient strips of sealing material mounted along opposite sides of said opening and projecting towards said door, deflector means mounted at the upper ends of said sides for deflecting the upper ends of said strips away from said door, and a plurality of projections angled away from said door and mounted on both lateral edge portions of each of said panel sections, said strips being bowed away from said door by and bearing against said projections when the door is closed for providing a seal therebetween and as said upward acting sectional door assembly is moved downwardly from the open to the closed position, the lower edges of the projections on the lowermost panel section engage the upper end portions of said strips which are deflected by said deflector means.

3. Apparatus for insulatingly sealing the space between the side of a door opening and the lateral edge portions of an upward acting sectional door having panel sections, said apparatus comprising a first resilient strip of sealing material mounted along said side and projecting towards said door, projections angled away from said door and mounted on the lateral edge portions of said panel sections spaced from the edges thereof, said strip being bowed away from said door by and bearing against said projections when the door is closed for providing a seal therebetween, and a second resilient sealing strip mounted along said side and being spaced laterally of said first sealing strip, said second strip bearing against the lateral edge portions of said panel sections laterally outwardly from the projections, an air space being formed between said first and second resilient strips to thereby provide a seal particularly useful with an insulated door.

4. The apparatus of claim 3 wherein said first resilient strip and said second resilient strip are mounted along both sides of said door.

5. Apparatus for sealing the space between the sides of a door opening and the lateral edge portions of a vertically slidable door having a plurality of hingedly connected flat panel sections spanning the opening laterally and no wider than the opening and tracks adjacent to the opening guiding the door between a vertical closed position and a horizontal elevated open position, said apparatus comprising resilient strips of sealing material secured to the sides of the door opening and normally extending toward the door substantially at right angles to the flat panels, rigid projections mounted on the lateral edge portions of each of the panels and extending outwardly therefrom at acute angles to the planes of the panels, the projections engaging and deflecting the strips when the door is in closed position to form a seal therebetween and being slidable relative to the strips during raising and lowering of the door and means cooperating with the upper ends of said strips and the lower ends of the projections on the lowermost panel section to cause engagement of the projections with the outer surfaces of the strips when the door is moved downwardly.

References Cited

UNITED STATES PATENTS

| | | | |
|---|---|---|---|
| 883,603 | 3/1908 | Withenbury | 20—69 |
| 1,989,513 | 1/1935 | Greegor | 160—41 |
| 2,613,844 | 10/1952 | Mounce. | |
| 2,738,559 | 3/1956 | Edwards | 20—69 |
| 2,793,690 | 5/1957 | Stroup | 160—201 |
| 2,827,115 | 3/1958 | Stroup | 160—201 X |
| 2,914,121 | 11/1959 | Taylor | 20—69 X |
| 3,017,218 | 1/1962 | Groth et al. | |

DAVID J. WILLIAMOWSKY, *Primary Examiner.*

HARRISON R. MOSELEY, *Examiner.*

W. E. HEATON, D. L. TAYLOR, *Assistant Examiners.*